(12) United States Patent
Suzuki et al.

(10) Patent No.: US 11,927,483 B2
(45) Date of Patent: Mar. 12, 2024

(54) FOURIER SPECTROPHOTOMETER WITH POLARIZATION MULTIPLEXING OPTICAL SYSTEM

(71) Applicant: Yokogawa Electric Corporation, Tokyo (JP)

(72) Inventors: Yasuyuki Suzuki, Musashino (JP); Yukihiro Nakamura, Musashino (JP); Tetsushi Namatame, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 17/771,517

(22) PCT Filed: Oct. 27, 2020

(86) PCT No.: PCT/JP2020/040328
§ 371 (c)(1),
(2) Date: Apr. 25, 2022

(87) PCT Pub. No.: WO2021/085442
PCT Pub. Date: May 6, 2021

(65) Prior Publication Data
US 2022/0381677 A1    Dec. 1, 2022

(30) Foreign Application Priority Data
Oct. 29, 2019    (JP) .................. 2019-196080

(51) Int. Cl.
*G01J 3/453*    (2006.01)
*G01J 3/02*    (2006.01)
(Continued)

(52) U.S. Cl.
CPC .............. *G01J 3/453* (2013.01); *G01J 3/0208* (2013.01); *G01J 3/027* (2013.01); *G01N 21/274* (2013.01);
(Continued)

(58) Field of Classification Search
CPC .... G01N 21/255; G01N 2021/458; G01J 3/45
See application file for complete search history.

(56) References Cited

U.S. PATENT DOCUMENTS 10,670,461 B2 *   6/2020   Warashina .......... G01B 9/02044
2016/0282184 A1 *   9/2016   Khalil ..................... G01J 3/108
(Continued)

FOREIGN PATENT DOCUMENTS

JP    6-504845 A    6/1994
JP    2019-52994 A    4/2019
(Continued)

*Primary Examiner* — Tarifur R Chowdhury
*Assistant Examiner* — Kemaya Nguyen
(74) *Attorney, Agent, or Firm* — RANKIN, HILL & CLARK LLP

(57) ABSTRACT

A Fourier spectrophotometer includes: a light source; an interferometer configured to obtain first and second interferograms whose intensity distributions are inverted from each other from the light emitted from light source; a multiplexing optical system configured to multiplex the first and second interferograms to irradiate the sample with a resultant interferogram; a demultiplexing optical system configured to demultiplex the first and second interferograms contained in the light passing through the sample; a light receiver configured to output a first light reception signal obtained by receiving the demultiplexed first interferogram and a second light reception signal obtained by receiving the demultiplexed second interferogram; and a signal processing device configured to perform processing for obtaining a noise-removed spectrum of the wavelength component in the analysis wavelength band by using the first and second light reception signals.

15 Claims, 7 Drawing Sheets

(51) Int. Cl.
*G01N 21/27* (2006.01)
*G01N 21/45* (2006.01)

(52) U.S. Cl.
CPC ....... *G01N 21/45* (2013.01); *G01N 2021/458* (2013.01)

(56) References Cited

U.S. PATENT DOCUMENTS

| | | |
|---|---|---|
| 2017/0120337 A1* | 5/2017 | Kanko .................. B33Y 10/00 |
| 2018/0217001 A1 | 8/2018 | Warashina et al. |
| 2019/0277700 A1* | 9/2019 | Maurer ................ G01J 3/4535 |
| 2020/0025611 A1* | 1/2020 | Mai ....................... G01J 3/4531 |
| 2020/0278256 A1 | 9/2020 | Suzuki et al. |

FOREIGN PATENT DOCUMENTS

| | | | |
|---|---|---|---|
| WO | 92/12404 A1 | 7/1992 | |
| WO | WO-9212404 A1 * | 7/1992 | ........... G01B 11/065 |
| WO | 2017/017859 A1 | 2/2017 | |

* cited by examiner

FOURIER SPECTROPHOTOMETER WITH POLARIZATION MULTIPLEXING OPTICAL SYSTEM

TECHNICAL FIELD

The present invention relates to a Fourier spectrophotometer.

Priority is claimed on Japanese Patent Application No. 2019-196080, filed Oct. 29, 2019, the content of which is incorporated herein by reference.

BACKGROUND ART

A Fourier spectrophotometer irradiates a sample with interference light (that is, an interferogram), receives light passing through the sample (that is, reflected light or transmitted light), and performs Fourier transform processing on an obtained light reception signal to obtain a spectrum of the light passing through the sample (for example, a wave number spectrum). Accordingly, the Fourier spectrophotometer performs analysis of the sample. A basic premise is that a sample that is an analysis target of such a Fourier spectrophotometer is a sample having no temporal change (or little change) in optical characteristics.

Patent Literature 1 below discloses a Fourier spectrophotometer capable of realizing high analysis accuracy even for a sample whose optical characteristics fluctuate with time. Specifically, the Fourier spectrophotometer disclosed in Patent Literature 1 below receives a wavelength component in a first wavelength band, which is a wavelength band in which a spectrum is obtained, and a wavelength component in a second wavelength band different from the first wavelength band, which are contained in light passing through a sample. The Fourier spectrophotometer disclosed in Patent Literature 1 removes noise of the wavelength component of the first wavelength band by using noise contained in the wavelength component of the second wavelength band.

CITATION LIST

Patent Literature

[Patent Literature 1] Japanese Unexamined Patent Application, First Publication No. 2019-52994

SUMMARY OF INVENTION

Technical Problem

Incidentally, in a Fourier spectrophotometer, when an S/N ratio (that is, a signal-to-noise ratio) of a light reception signal obtained by receiving light passing through a sample is low, analysis accuracy is likely to decrease. The same also applies to the Fourier spectrophotometer disclosed in Patent Literature 1 described above. Therefore, in the Fourier spectrophotometer, in order to obtain a light reception signal having a high S/N ratio, it is important to effectively utilize light to be used for analysis of the sample without wasting the light as far as possible.

Some aspects of the present invention have been made in view of the above circumstances, and an object of the present invention is to provide a Fourier spectrophotometer capable of realizing high analysis accuracy by effectively utilizing light to be used for analysis without waste.

Solution to Problem

[1] To solve the above-described problem, a Fourier spectrophotometer (1) according to one aspect of the present invention includes: a light source (10) configured to emit light (L0) containing a wavelength component in an analysis wavelength band, the analysis wavelength band being a wavelength band in which a spectrum of light passing through a sample (SP) as an analysis target is obtained; an interferometer (20) configured to obtain a first interferogram (L11) and a second interferogram (L12) whose intensity distributions are inverted from each other as interferograms (L2) from the light emitted from the light source, the interferograms being interference light; a multiplexing optical system (30) configured to multiplex the first interferogram with the second interferogram to irradiate the sample with a resultant interferogram; a demultiplexing optical system (40) configured to demultiplex the first interferogram (L41) and the second interferogram (L42) contained in the light (L3) passing through the sample; a light receiver (50) configured to output a first light reception signal (S1) obtained by receiving the demultiplexed first interferogram and a second light reception signal (S2) obtained by receiving the demultiplexed second interferogram; and a signal processing device (60) configured to perform processing for obtaining a noise-removed spectrum of the wavelength component in the analysis wavelength band by using the first light reception signal and the second light reception signal.

[2] In addition, the Fourier spectrophotometer according to one aspect of the present invention, the signal processing device includes: a noise remover (61) configured to remove noise by obtaining a difference between the first light reception signal and the second light reception signal; and a Fourier transformer (62) configured to perform Fourier transform processing on a signal indicating the difference obtained by the noise remover to obtain the spectrum of the wavelength component in the analysis wavelength band.

[3] In addition, in the Fourier spectrophotometer according to one aspect of the present invention, the multiplexing optical system includes a first lens (LS1) configured to irradiate a prescribed irradiation area (A1) of the sample with the first interferogram and the second interferogram incident at different positions on a front focal plane, and the demultiplexing optical system includes a second lens (LS2) configured to cause the first interferogram and the second interferogram contained in the light passing through the sample to focus on different positions (FP1, FP2) on a rear focal plane.

[4] In addition, in the Fourier spectrophotometer according to one aspect of the present invention, the multiplexing optical system includes a polarization multiplexing element (31) configured to multiplex the first interferogram in a first polarized state among the first interferograms obtained by the interferometer, with the second interferogram in a second polarized state different from the first polarized state among the second interferograms obtained by the interferometer, and the demultiplexing optical system includes a polarization demultiplexing element (41) configured to demultiplex the first interferogram and the second interferogram contained in the light passing through the sample according to polarized states of the first interferogram and the second interferogram.

[5] In addition, in the Fourier spectrophotometer according to one aspect of the present invention, the multiplexing optical system includes: a first polarizer (32) configured to cause the first interferogram obtained by the interferometer to enter the first polarized state; and a second polarizer (33) configured to cause the second interferogram obtained by the interferometer to enter the second polarized state.

[6] In addition, in the Fourier spectrophotometer according to one aspect of the present invention, the multiplexing optical system includes a first deflection element (M1) configured to direct the first interferogram in the second polarized state and the second interferogram in the first polarized state passing through the polarization multiplexing element to the sample, and the demultiplexing optical system includes a second deflection element (M2) configured to direct light reflected by the first deflection element and passing through the sample to the polarization demultiplexing element.

[7] In addition, in the Fourier spectrophotometer according to one aspect of the present invention, the interferometer includes: a half mirror (21) configured to branch the light emitted from the light source into a first branch light and a second branch light, and cause the first branch light and the second branch light passing through different optical paths to interfere with each other to obtain the first interferogram (L01) and the second interferogram (L02); a fixed mirror (22) configured to reflect the first branch light branched by the half mirror and cause the first branch light to be incident on the half mirror; a moving mirror (23) configured to be able to reciprocate along an optical path of the second branch light, reflect the second branch light branched by the half mirror, and cause the second branch light to be incident on the half mirror; a first output (PT1) configured to output the first interferogram to the outside; and a second output (PT2) configured to output the second interferogram to the outside.

[8] In addition, in the Fourier spectrophotometer according to one aspect of the present invention, the light source is a halogen lamp having a wavelength bandwidth of 350 [nm] to 4500 [nm].

[9] In addition, in the Fourier spectrophotometer according to one aspect of the present invention, the light receiver includes a detector capable of receiving a wavelength component of 1 [μm] to 2.5 [μm].

[10] In addition, in the Fourier spectrophotometer according to one aspect of the present invention, the first interferogram and the second interferogram are incident on different positions on the front focal plane of the first lens.

[11] In addition, in the Fourier spectrophotometer according to one aspect of the present invention, the first lens is a Fourier transform lens or a telecentric lens.

[12] In addition, in the Fourier spectrophotometer according to one aspect of the present invention, the second lens is a Fourier transform lens or a telecentric lens.

[13] In addition, in the Fourier spectrophotometer according to one aspect of the present invention, the first polarized state is p-polarized light, and the second polarized state is s-polarized light.

[14] In addition, in the Fourier spectrophotometer according to one aspect of the present invention, the polarization multiplexing element transmits the first interferogram converted into the first polarized state by the first polarizer, and reflects the second interferogram converted into the second polarized state by the second polarizer.

[15] In addition, in the Fourier spectrophotometer according to one aspect of the present invention, the polarization demultiplexing element transmits the light in the first polarized state contained in the light passing through the sample and reflects the light in the second polarized state contained in the light passing through the sample.

[16] In addition, in the Fourier spectrophotometer according to one aspect of the present invention, the polarization multiplexing element transmits a first polarized state component of the first interferogram and reflects a second polarized state component of the first interferogram, and transmits the first polarized state component of the second interferogram and reflects the second polarized state component of the second interferogram.

[17] In addition, in the Fourier spectrophotometer according to one aspect of the present invention, the polarization multiplexing element irradiates the sample with the transmitted first polarized state component of the first interferogram and the reflected second polarized state component of the second interferogram.

[18] In addition, in the Fourier spectrophotometer according to one aspect of the present invention, the first deflection element and the second deflection element are reflection mirrors.

[19] In addition, in the Fourier spectrophotometer according to one aspect of the present invention, the polarization multiplexing element emits the reflected second polarized state component of the first interferogram and the transmitted first polarized state component of the second interferogram to the first deflection element.

[20] In addition, in the Fourier spectrophotometer according to one aspect of the present invention, the signal processing device removes noise superimposed on the first light reception signal and the second light reception signal by performing processing of subtracting the second light reception signal from the first light reception signal.

Advantageous Effects of Invention

According to an aspect of the present invention, there is an effect that it is possible to realize high analysis accuracy by effectively utilizing light to be used for analysis without waste.

DESCRIPTION OF EMBODIMENTS

Figure 1:
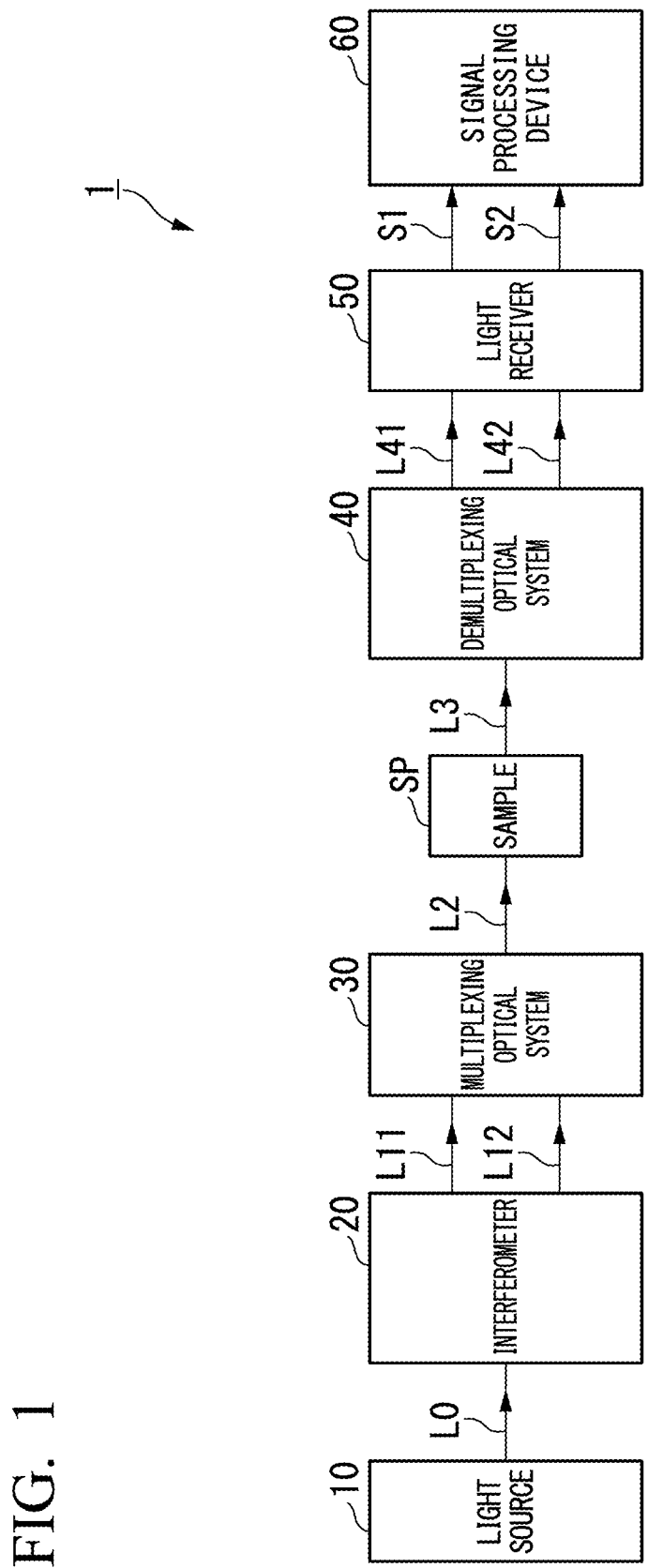
FIG. 1 is a block diagram illustrating a main configuration of a Fourier spectrophotometer according to an embodiment of the present invention.

Hereinafter, a Fourier spectrophotometer according to an embodiment of the present invention will be described in detail with reference to the drawings.

[Overview]

An embodiment of the present invention realizes high analysis accuracy by effectively utilizing light to be used for analysis without waste. Specifically, high analysis accuracy is realized by obtaining a light reception signal having a high S/N ratio by effectively utilizing the light to be used for analysis without waste. In the embodiment of the present invention, even when a sample suffers a temporal fluctuation in optical characteristics, high analysis accuracy is realized by effectively utilizing the light to be used for analysis without waste.

The Fourier spectrophotometer includes an interferometer in order to obtain an interferogram with which a sample is irradiated. As such an interferometer, a Michelson interferometer including, for example, a half mirror, a fixed mirror, and a moving mirror can be used. This interferometer obtains an interferogram with which the sample is irradiated, by branching light emitted from a light source into a first branch light directed to the fixed mirror and a second branch light directed to the moving mirror using the half mirror, and causing the first branch light reflected by the fixed mirror and the second branch light reflected by the moving mirror to interfere with each other using the half mirror.

Incidentally, the Fourier spectrophotometer causes a change in optical path length difference (that is, a difference between an optical path length of the first branch light and an optical path length of the second branch light described above) using the moving mirror provided in the interferometer, thereby obtaining an interferogram, which is modulated light. Therefore, a basic premise is that a sample that is an analysis target of the Fourier spectrophotometer has no temporal change in optical characteristics, or even when the sample has a temporal change in optical characteristics, a speed of the change is sufficiently slower than a moving speed of the moving mirror provided in the interferometer.

However, when the Fourier spectrophotometer is used in various fields, it is conceivable that a sample whose optical characteristics change relatively rapidly with respect to the moving speed of the moving mirror is the analysis target. For example, it is conceivable that a fluid in which particles float (which may be powder) in an industrial process or a chemical process, a mobile object having an uneven light scattering surface formed on a front surface, a suspended sample with liquidity agitated in a stirring container, or the like is an analysis target of a Fourier spectrophotometer.

When an attempt is made to analyze such a sample whose optical characteristics change relatively rapidly with a Fourier spectrophotometer, an interferogram passing through the sample fluctuates depending on a temporal change in the optical characteristics of the sample. In other words, the interferogram passing through the sample is, so to speak, modulated depending on the temporal change in the optical characteristics of the sample. Accordingly, noise containing a large amount of low frequency components (so-called "colored noise") is superimposed on the interferogram passing through the sample. Since the noise superimposed on the interferogram appears as noise even when Fourier transform processing is performed, analysis accuracy decreases.

Further, in the Fourier spectrophotometer, when the S/N ratio of the light reception signal obtained by receiving the light passing through the sample is low, the analysis accuracy is likely to decrease. The same applies to a case when a sample whose optical characteristics fluctuate with time is analyzed. Therefore, in the Fourier spectrophotometer, in order to obtain a light reception signal having a high S/N ratio, it is important to effectively utilize light to be used for analysis of the sample without wasting the light as far as possible.

In the embodiment of the present invention, an interferometer that obtains a first interferogram and a second interferogram whose intensity distributions are inverted from each other, a multiplexing optical system that multiplexes the first interferogram with the second interferogram to irradiate the sample, and a demultiplexing optical system that demultiplexes the first interferogram and the second interferogram contained in the light passing through the sample are included. A noise-removed spectrum of a wavelength component in an analysis wavelength band that is a wavelength band in which a spectrum is obtained is obtained by using a first light reception signal obtained by receiving the demultiplexed first interferogram and a second light reception signal obtained by receiving the demultiplexed second interferogram. This makes it possible to realize high analysis accuracy by effectively utilizing light to be used for analysis without waste.

Embodiment

<Main Configuration of Fourier Spectrophotometer>

FIG. 1 is a block diagram illustrating a main configuration of a Fourier spectrophotometer 1 according to an embodiment of the present invention. As illustrated in FIG. 1, the Fourier spectrophotometer 1 according to the present embodiment includes a light source 10, an interferometer 20, a multiplexing optical system 30, a demultiplexing optical system 40, a light receiver 50, and a signal processing device 60. Such a Fourier spectrophotometer 1 irradiates the sample SP with light containing a plurality of wavelength components (that is, an interferogram L2), receives light L3 passing through the sample SP, and performs Fourier transform processing on obtained light reception signals S1 and S2 to obtain a spectrum (for example, a wave number spectrum) of the light L3 passing through the sample SP, thereby performing analysis of the sample SP.

The above sample SP may be any sample, but in the present embodiment, a sample whose optical characteristics change with time is used. Examples of the sample include a fluid in which particles float (which may be powder) in an industrial process or a chemical process, a mobile object having an uneven light scattering surface formed on a front surface, or a suspended sample with liquidity agitated in a stirring container. Examples of the light L3 passing through the sample SP include reflected light that has been reflected by the sample SP, and transmitted light that has been transmitted through the sample SP, but in the present embodiment, the light L3 is the transmitted light that has been transmitted through the sample SP.

The light source 10 emits light L0 containing a plurality of wavelength components. As the light source 10, any light source can be used depending on optical characteristics of the sample SP. For example, a light source having a wide wavelength bandwidth such as a halogen lamp or a light source including a semiconductor light emitting element such as a laser diode (LD) or a light emitting diode (LED) can be used. In the present embodiment, the halogen lamp is used as the light source 10. A wavelength bandwidth of the halogen lamp is, for example, a range of a wavelength of about 350 [nm] to 4500 [nm].

The interferometer 20 interferes with the light L0 emitted from the light source 10 to obtain light (that is, interference light: interferogram) with which the sample SP is irradiated. Here, the interferometer 20 of the present embodiment obtains, as the above-described interferograms, an interferogram L11 (that is, a first interferogram) and an interferogram L12 (that is, a second interferogram) whose intensity distributions are inverted from each other. Such interferograms L11 and L12 are obtained in order to realize high analysis accuracy by effectively utilizing the light to be used for analysis of the sample SP without waste. Details of the interferometer 20 will be described below.

The multiplexing optical system 30 multiplexes the interferograms L11 and L12 obtained by the interferometer 20 and irradiates the sample SP with a resultant interferogram as the interferogram L2. The interferograms L11 and L12 obtained by the interferometer 20 are combined by the multiplexing optical system 30 so that the same area (or substantially the same area) of the sample SP is irradiated with the interferograms L11 and L12. By the area being irradiated with the interferograms L11 and L12 in this way, the interferograms L11 and L12 are similarly modulated (that is, modulated depending on the temporal change in the optical characteristics of the sample SP). Details of the multiplexing optical system 30 will be described below.

The demultiplexing optical system 40 separates an interferogram L41 and an interferogram L42 contained in the light (that is, transmitted light of the interferogram L2) L3 passing through the sample SP. Here, the light L3 passing through the sample SP is the interferogram L2 absorbed according to the optical characteristics of the sample SP and modulated depending on the temporal change in the optical characteristics of the sample SP. Therefore, the interferogram L41 is the interferogram L11 absorbed according to the optical characteristics of the sample SP and modulated depending on the temporal change in the optical characteristics of the sample SP. The interferogram L42 is the interferogram L12 absorbed according to the optical characteristics of the sample SP and modulated depending on the temporal change in the optical characteristics of the sample SP. Details of the demultiplexing optical system 40 will be described below.

The light receiver 50 receives the interferograms L41 and L42 demultiplexed by the demultiplexing optical system 40, and outputs the light reception signal S1 (also referred to as a first light reception signal) and the light reception signal S2 (also referred to as a second light reception signal). The light receiver 50 includes, for example, a detector (not illustrated) that receives the demultiplexed interferogram L41 and outputs the light reception signal S1, and a detector (not illustrated) that receives the demultiplexed interferogram L42 and outputs the light reception signal S2.

As the detector included in the light receiver 50, a detector capable of receiving a wavelength component in a wavelength band (that is, an analysis wavelength band) that is a prescribed analysis target may be used. For example, the analysis wavelength band of the detector is about 1 [μm] to 2.5 [μm]. The analysis wavelength band of the detector can be set to any wavelength band at the time of designing the Fourier spectrophotometer 1.

The signal processing device 60 performs processing for obtaining a spectrum from which noise caused by a temporal change in the optical characteristics of the sample SP has been removed, by using the light reception signals S1 and S2 output from the light receiver 50. The signal processing device 60 outputs a signal indicating the spectrum obtained by the above processing to the outside, or causes a display device (for example, a liquid crystal display device) (not illustrated) to display the signal. Details of the signal processing device 60 will be described below.

<Example of Configuration of Interferometer>

Figure 2:
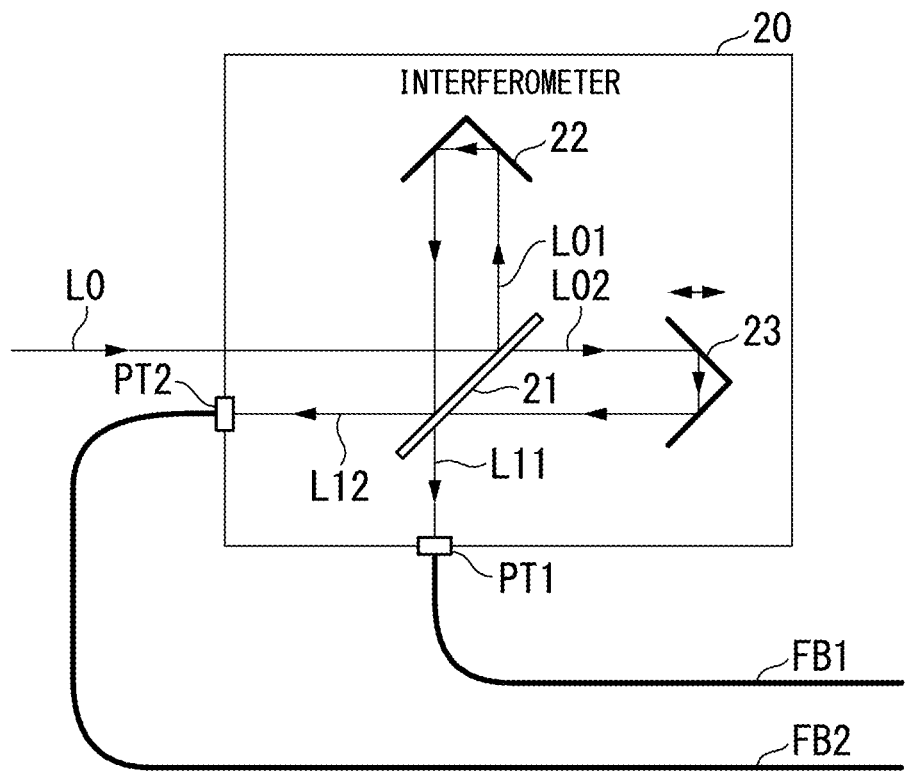
FIG. 2 is a diagram illustrating a configuration example of an interferometer included in the Fourier spectrophotometer according to the embodiment of the present invention.

FIG. 2 is a diagram illustrating a configuration example of the interferometer 20 included in the Fourier spectrophotometer 1 (see FIG. 1) according to the embodiment of the present invention. The interferometer 20 is a Michelson interferometer including a half mirror 21, a fixed mirror 22, a moving mirror 23, an output port PT1 (also referred to as a first output), and an output port PT2 (also referred to as a second output). The interferometer 20 is not limited to the Michelson interferometer, and any interferometer can be used.

The half mirror 21 branches the light L0 emitted from the light source 10 into a branch light L01 directed to the fixed mirror 22 and a branch light L02 directed to the moving mirror 23. The half mirror 21 branches the light L0 emitted from the light source 10 at an intensity ratio of, for example, 1:1. Further, the half mirror 21 causes the branch light L01 reflected by the fixed mirror 22 and the branch light L02 reflected by the moving mirror 23 to interfere with each other to obtain the interferogram L11 and the interferogram L12.

The fixed mirror 22 is disposed on an optical path of the branch light L01 in a state in which a reflecting surface of the fixed mirror 22 is directed to the half mirror 21. The fixed mirror 22 shifts the branch light L01 branched by the half mirror 21 by a predetermined amount in a direction orthogonal to the optical path of the branch light L01 and reflects the branch light L01 toward the half mirror 21. As the fixed mirror 22, for example, a retroreflector such as a two-sided corner reflector can be used.

The moving mirror 23 is disposed on an optical path of the branch light L02 in a state in which a reflecting surface of the moving mirror 23 is directed to the half mirror 21. The moving mirror 23 shifts the branch light L02 branched by the half mirror 21 by a predetermined amount (that is, the same amount as the shift amount of the fixed mirror 22) in a direction orthogonal to the optical path of the branch light L02 and reflects the branch light L02 toward the half mirror 21. As the moving mirror 23, for example, a retroreflector such as a two-sided corner reflector can be used, as in the fixed mirror 22. The moving mirror 23 is configured to be able to reciprocate along the optical path of the branch light L02 by means of a drive mechanism (not illustrated). A reciprocating motion speed of the moving mirror 23 is set to, for example, about five times per second.

Here, when the moving mirror 23 reciprocates, the wavelength components contained in the light L0 emitted from the light source 10 are subjected to intensity modulation at different frequencies. For example, a wavelength component with a relatively short wavelength is subjected to intensity modulation at a higher frequency than that of a wavelength component with a relatively long wavelength. In the interferograms L11 and L12 obtained by the interferometer 20, such wavelength components subjected to the intensity modulation at different frequencies are overlapped each other.

Further, the interferograms L11 and L12 are obtained by causing the branch light L01 and the branch light L02 to interfere with each other. Therefore, it is clear, from an energy conservation law, that the intensity distributions of the interferograms L11 and L12 are inverted from each other. That is, when the intensity distribution of the interferogram L11 is inverted, the intensity distribution of the interferogram L12 is obtained. Further, when the intensity distribution of the interferogram L12 is inverted, the intensity distribution of the interferogram L11 is obtained.

The output port PT1 is a port for outputting the interferogram L11 to the outside. The output port PT1 is configured so that an optical fiber (that is, an optical fiber FB1) can be connected to the output port PT1. When the optical fiber FB1 is connected to the output port PT1, the interferogram L11 output from the output port PT1 is guided by the optical fiber FB1.

The output port PT2 is a port for outputting the interferogram L12 to the outside. The output port PT2 is configured so that an optical fiber (that is, an optical fiber FB2) can be connected to the output port PT2, like the output port PT1. When the optical fiber FB2 is connected to the output port PT2, the interferogram L12 output from the output port PT2 is guided by the optical fiber FB2.

<First Configuration Example of Multiplexing Optical System and Demultiplexing Optical System>

Figure 3:
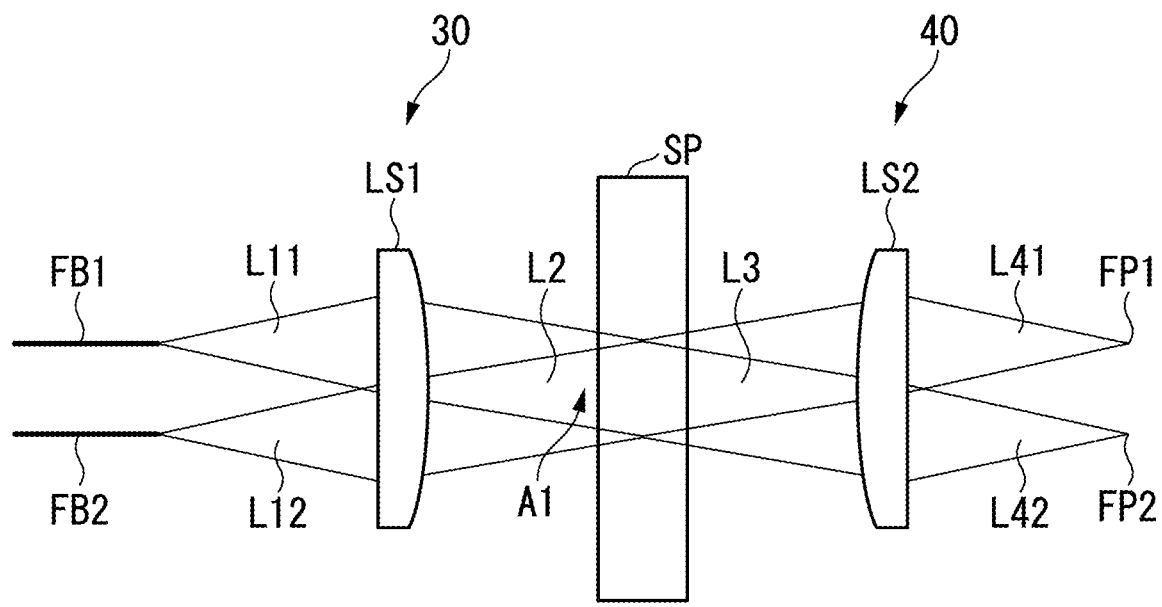
FIG. 3 is a diagram illustrating a first configuration example of a multiplexing optical system and a demultiplexing optical system included in the Fourier spectrophotometer according to an embodiment of the present invention.

FIG. 3 is a diagram illustrating a first configuration example of the multiplexing optical system 30 and the demultiplexing optical system 40 included in the Fourier spectrophotometer 1 (see FIG. 1) according to the embodiment of the present invention. As illustrated in FIG. 3, the multiplexing optical system 30 of the first configuration example includes a lens LS1 (also referred to as a first lens). The multiplexing optical system 30 of the first configuration example spatially multiplexes the interferograms L11 and L12 guided by the optical fibers FB1 and FB2 and irradiates a prescribed irradiation area A1 of the sample SP with a resultant interferogram. The demultiplexing optical system 40 of the first configuration example includes a lens LS2 (also referred to as a second lens). The demultiplexing optical system 40 of the first configuration example spatially demultiplexes the light L3 passing through the irradiation area A1 of the sample SP.

As the lens LS1 of the multiplexing optical system 30, for example, a Fourier transform lens, an object side telecentric lens, or another lens can be used. The lens LS1 is installed so that, for example, ends of the optical fibers FB1 and FB2 are disposed at different positions on a front focal plane, and the sample SP is disposed on a rear focal plane. This makes it possible to irradiate the irradiation area A1 of the sample SP with the interferograms L11 and L12 incident on different positions on the front focal plane of the lens LS1.

As the lens LS2 of the demultiplexing optical system 40, for example, a Fourier transform lens, an image side telecentric lens, or another lens can be used. The lens LS2 is installed so that, for example, the sample SP is disposed on the front focal plane, and the detector (not illustrated) of the light receiver 50 is disposed at different positions FP1 and FP2 within the rear focal plane. This makes it possible to cause the interferograms L41 and L42 contained in the light L3 passing through the irradiation area A1 of the sample SP to focus on the different positions FP1 and FP2 on the rear focal plane.

<Second Configuration Example of Multiplexing Optical System and Demultiplexing Optical System>

Figure 4:
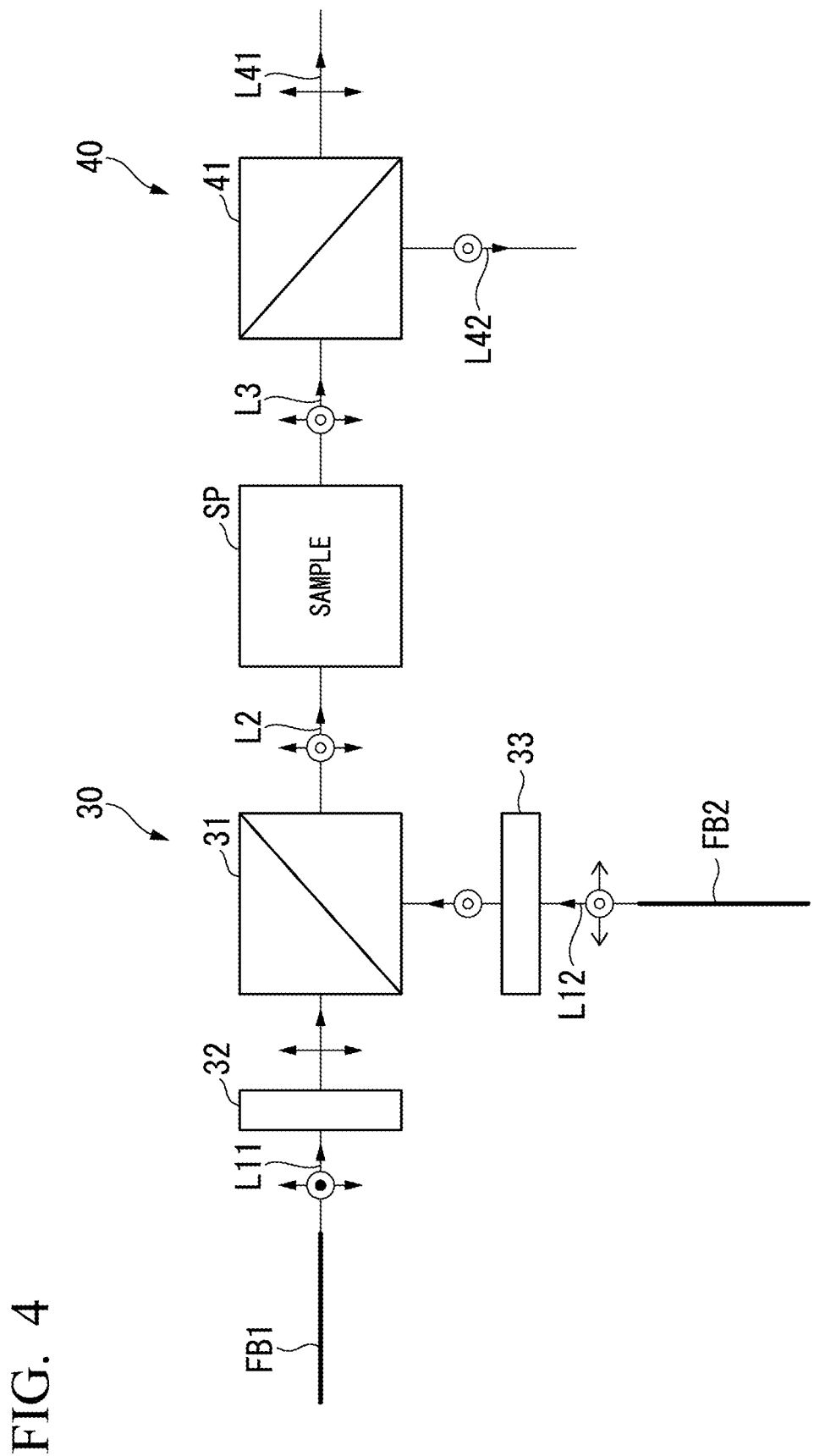
FIG. 4 is a diagram illustrating a second configuration example of the multiplexing optical system and the demultiplexing optical system included in the Fourier spectrophotometer according to the embodiment of the present invention.

FIG. 4 is a diagram illustrating a second configuration example of the multiplexing optical system 30 and the demultiplexing optical system 40 included in the Fourier spectrophotometer 1 (see FIG. 1) according to the embodiment of the present invention. As illustrated in FIG. 4, the multiplexing optical system 30 of the second configuration example includes a polarization beam splitter 31 (also referred to as a polarization multiplexing element), a polarizer 32 (also referred to as a first polarizer), and a polarizer 33 (also referred to as a second polarizer). The multiplexing optical system 30 of the second configuration example multiplexes the interferograms L11 and L12 guided by the optical fibers FB1 and FB2, with polarized states of the interferograms L11 and L12 differing from each other. The demultiplexing optical system 40 of the second configuration example includes a polarization beam splitter 41 (also referred to as a polarization demultiplexing element). The demultiplexing optical system 40 of the second configuration example demultiplexes the light L3 passing through the sample SP depending on a polarized state of the light L3.

The polarization beam splitter 31 is disposed between an end of the optical fiber FB1 and the sample SP. The polarization beam splitter 31 transmits the incident p-polarized light (also referred to as a first polarized state) and reflects the incident s-polarized light (also referred to as a second polarized state). In FIG. 4, the p-polarized light is shown as-polarized light parallel to a paper surface, and the s-polarized light is shown as polarized light perpendicular to the paper surface. Further, in FIG. 4, a polarized component related to the interferogram L11 and a polarized component related to the interferogram L12 are shown by different notations in order to facilitate understanding.

The polarizer 32 is disposed between the end of the optical fiber FB1 and the polarization beam splitter 31. The polarizer 32 converts the interferogram L11 emitted from the optical fiber FB1 into p-polarized light. The polarizer 33 is disposed between an end of the optical fiber FB2 and the polarization beam splitter 31. The polarizer 33 converts the interferogram L12 emitted from the optical fiber FB2 into the s-polarized light.

The interferogram L11 emitted from the optical fiber FB1 is converted into the p-polarized light by the polarizer 32, and the interferogram L12 emitted from the optical fiber FB2 is converted into the s-polarized light by the polarizer 33. The p-polarized interferogram L11 is transmitted through the polarization beam splitter 31 and travels toward the sample SP. The interferogram L12 of the s-polarized light is reflected by the polarization beam splitter 31 and travels toward the sample SP. Thus, the sample SP is irradiated with the interferogram L2 obtained by multiplexing the interferogram L11 of the p-polarized light and the interferogram L12 of the s-polarized light.

The polarization beam splitter 41 is disposed between the sample SP and the light receiver 50 (not illustrated in FIG. 4). The polarization beam splitter 41 demultiplexer the light L3 through the sample SP depending on a polarized state of the light L3. Specifically, the polarization beam splitter 41 transmits the interferogram L41 of the p-polarized light contained in the light L3 and reflects the interferogram L42 of the s-polarized light contained in the light L3. Thus, the interferogram L41 and the interferogram L42 contained in the light L3 are demultiplexed.

<Third Configuration Example of Multiplexing Optical System and Demultiplexing Optical System>

Figure 5:
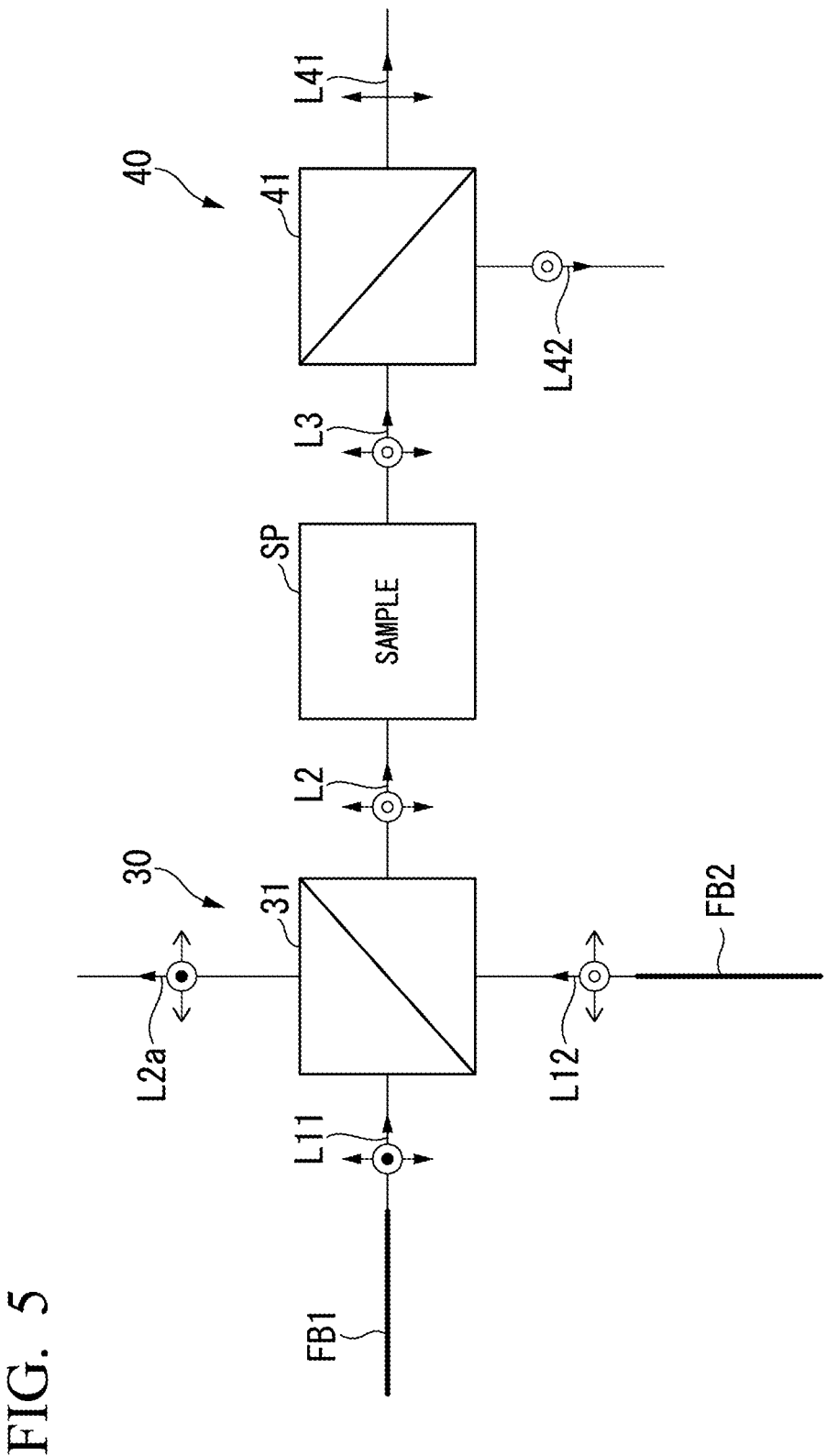
FIG. 5 is a diagram illustrating a third configuration example of the multiplexing optical system and the demultiplexing optical system included in the Fourier spectrophotometer according to the embodiment of the present invention.

FIG. 5 is a diagram illustrating a third configuration example of the multiplexing optical system 30 and the demultiplexing optical system 40 included in the Fourier spectrophotometer 1 (see FIG. 1) according to the embodiment of the present invention. As illustrated in FIG. 5, the multiplexing optical system 30 of the third configuration example does not include the polarizers 32 and 33 of the multiplexing optical system 30 illustrated in FIG. 4. The demultiplexing optical system 40 of the third configuration example has the same configuration as the demultiplexing optical system 40 illustrated in FIG. 4. Therefore, description of the demultiplexing optical system 40 will be omitted.

When the interferogram L11 emitted from the optical fiber FB1 is incident on the polarization beam splitter 31, the p-polarized component is transmitted through the polarization beam splitter 31 and travels toward the sample SP, and the s-polarized component is reflected by the polarization beam splitter 31. When the interferogram L12 emitted from the optical fiber FB2 is incident on the polarization beam splitter 31, the s-polarized component is reflected by the polarization beam splitter 31 and travels toward the sample SP, and the p-polarized component is transmitted through the polarization beam splitter 31.

Thus, the sample SP is irradiated with the interferogram L2 obtained by multiplexing the p-polarized component of the interferogram L11 and the s-polarized component of the interferogram L12.

In addition, in the third configuration example, an interferogram L2a obtained by multiplexing the s-polarized component of the interferogram L11 with the p-polarized component of the interferogram L12 is obtained. Since the sample SP is not irradiated with this interferogram L2a, the interferogram L2a is not used for analysis of the sample SP.

<Fourth Configuration Example of Multiplexing Optical System and Demultiplexing Optical System>

Figure 6:
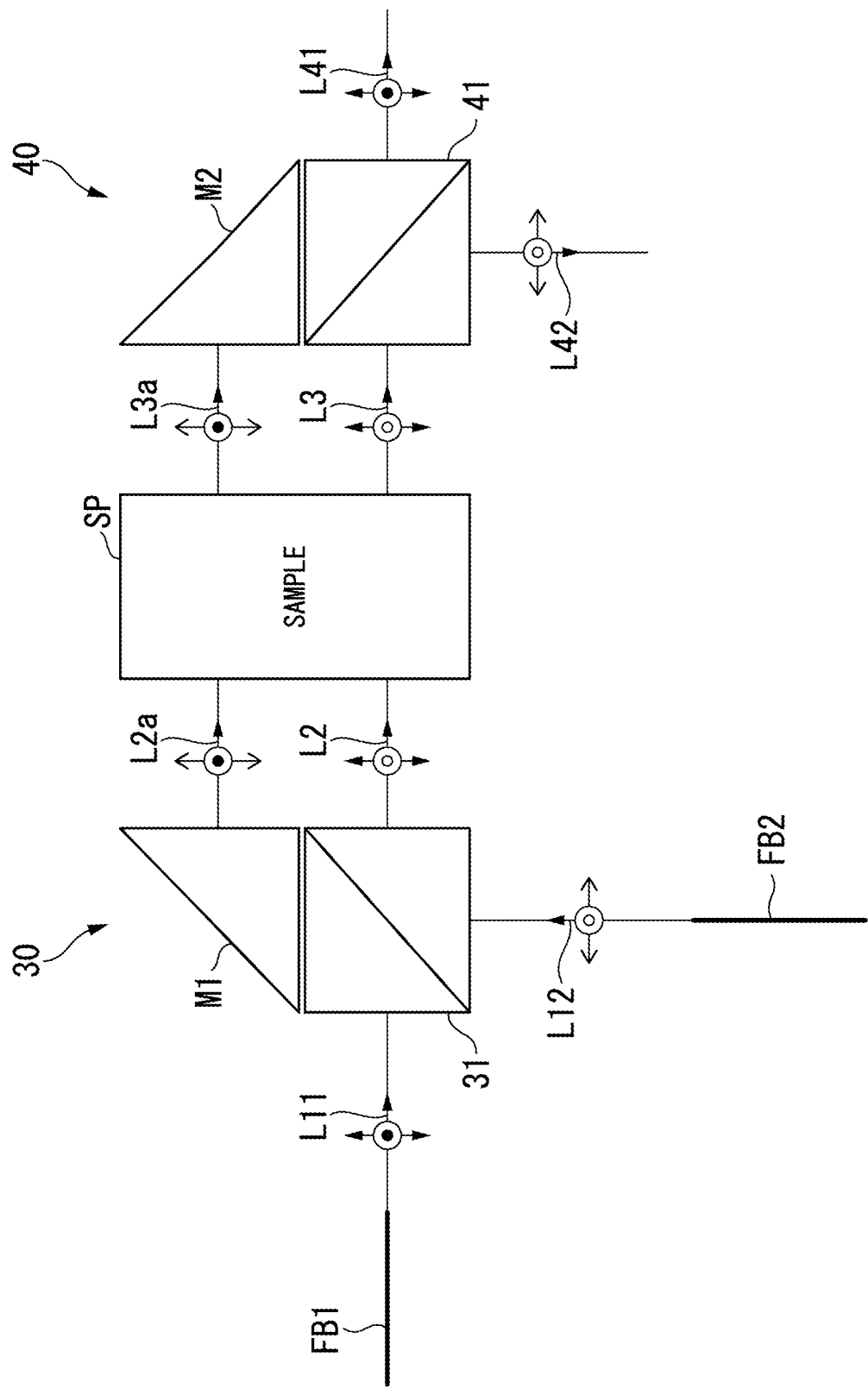
FIG. 6 is a diagram illustrating a fourth configuration example of the multiplexing optical system and the demultiplexing optical system included in the Fourier spectrophotometer according to the embodiment of the present invention.

FIG. 6 is a diagram illustrating a fourth configuration example of the multiplexing optical system 30 and the demultiplexing optical system 40 included in the Fourier spectrophotometer 1 (see FIG. 1) according to the embodiment of the present invention. As illustrated in FIG. 6, the multiplexing optical system 30 of the fourth configuration example is obtained by adding a reflection mirror M1 (also referred to as a first deflection element) to the multiplexing optical system 30 illustrated in FIG. 5. The demultiplexing optical system 40 of the fourth configuration example is obtained by adding a reflection mirror M2 (also referred to as a second deflection element) to the demultiplexing optical system 40 illustrated in FIGS. 4 and 5.

The reflection mirror M1 reflects the interferogram L2a (that is, an interferogram obtained by multiplexing the s-polarized component of the interferogram L11 with the p-polarized component of the interferogram L12) obtained by the polarization beam splitter 31 and directs the interferogram L2a to the sample SP. It is preferable for a position in which the sample SP is irradiated with the interferogram L2a to be as close as possible to a position in which the sample SP is irradiated with the interferogram L2. This is because the interferograms L2 and L2a are modulated in the same manner as possible depending on the temporal change in the optical characteristics of the sample SP. For the reflection mirror M1, any reflection mirror can be used as long as the reflection mirror can reflect the interferogram L2a and direct the interferogram L2a to the sample SP.

The reflection mirror M2 reflects light L3a passing through the sample SP and directs the light L3a to the polarization beam splitter 41. Here, the light L3a passing through the sample SP is the interferogram L2a absorbed according to the optical characteristics of the sample SP and modulated depending on the temporal change in the optical characteristics of the sample SP. For the reflection mirror M2, any reflection mirror can be used as long as the reflection mirror can reflect the light L3a passing through the sample SP and direct the light L3a to the polarization beam splitter 41.

In the fourth configuration example, the interferogram L2a obtained by the polarization beam splitter 31 is reflected by the reflection mirror M1, and the sample SP is irradiated with the reflected interferogram L2a. After the light L3a passing through the sample SP is reflected by the reflection mirror M2, the light L3a is incident on the polarization beam splitter 41. The polarization beam splitter 41 reflects the s-polarized component contained in the light L3a passing through the sample SP, transmits the p-polarized component, and performs demultiplexing into a component of the interferogram L41 and a component of the interferogram L42.

<Configuration Example of Signal Processing Device>

Figure 7:
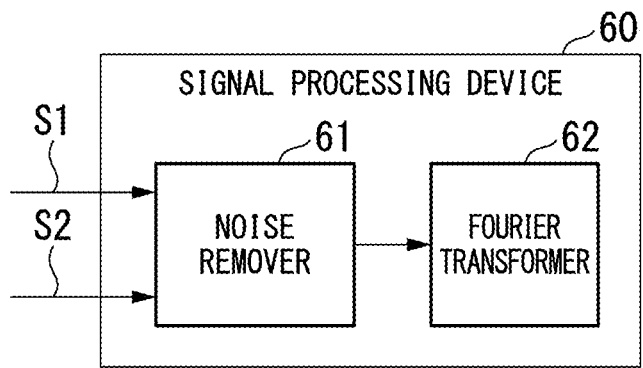
FIG. 7 is a block diagram illustrating a configuration example of a signal processing device included in the Fourier spectrophotometer according to the embodiment of the present invention.

FIG. 7 is a block diagram illustrating a configuration example of the signal processing device 60 included in the Fourier spectrophotometer 1 (see FIG. 1) according to the embodiment of the present invention. As illustrated in FIG. 7, the signal processing device 60 includes a noise remover 61 that receives the light reception signals S1 and S2, and a Fourier transformer 62 that receives an output signal of the noise remover 61.

The noise remover 61 removes noise superimposed on the light reception signals S1 and S2 by using the light reception signals S1 and S2. Specifically, the noise remover 61 obtains a difference between the light reception signal S1 and the light reception signal S2, thereby removing the noise superimposed on the light reception signals S1 and S2. For example, the noise remover 61 removes the noise superimposed on the light reception signals S1 and S2 by performing processing of subtracting the light reception signal S2 from the light reception signal S1. The processing that is performed by the noise remover 61 may be any processing as long as the noise superimposed on the light reception signals S1 and S2 can be removed, and is not limited to the processing of subtracting the light reception signal S2 from the light reception signal S1.

The Fourier transformer 62 performs Fourier transform processing on a signal that is output from the noise remover 61 to obtain a spectrum of the wavelength component in the analysis wavelength band. Here, the signal that is output from the noise remover 61 is a signal from which the noise caused by the temporal change in the optical characteristics of the sample SP has been removed. Therefore, the spectrum of the wavelength component in the analysis wavelength band obtained by the Fourier transformer 62 is a spectrum from which the noise caused by the temporal change in the optical characteristics of the sample SP has been removed.

<Operation of Fourier Spectrophotometer>

Next, an operation of the Fourier spectrophotometer in the above configuration will be described. Hereinafter, it is assumed that the multiplexing optical system 30 and the demultiplexing optical system 40 provided in the Fourier spectrophotometer 1 are those illustrated in FIG. 4 in order to facilitate understanding.

When the light L0 containing a plurality of wavelength components is emitted from the light source 10, the light L0 is incident on the interferometer 20. The light L0 incident on the interferometer 20 is branched into the branch light L01 directed to the fixed mirror 22 and the branch light L02 directed to the moving mirror 23 by the half mirror 21, as illustrated in FIG. 2.

The branch light L01 branched by the half mirror 21 is reflected by the fixed mirror 22, is shifted by a predetermined amount, then travels in an opposite direction, and is incident on the half mirror 21. Further, the branch light L02 branched by the half mirror 21 is reflected by the moving mirror 23, is shifted by a predetermined amount, then travels in an opposite direction, and is incident on the half mirror 21. When the branch light L01 and the branch light L02 are incident on the half mirror 21, the branch light L01 and the branch light L02 interfere with each other so that the interferograms L11 and L12 are obtained.

Here, since the moving mirror 23 provided in the interferometer 20 reciprocates, the wavelength components contained in the light L0 emitted from the light source 10 are subjected to intensity modulation at different frequencies. For example, a wavelength component with a relatively short wavelength is subjected to intensity modulation at a higher frequency than that of a wavelength component with a relatively long wavelength. The interferograms L11 and L12 whose wavelength components subjected to the intensity modulation at different frequencies are overlapped with each other are obtained by the interferometer 20.

The interferogram L11 obtained by the interferometer 20 is output from the output port PT1 and guided to the multiplexing optical system 30 by the optical fiber FB1. The interferogram L12 obtained by the interferometer 20 is output from the output port PT2 and guided to the multiplexing optical system 30 by the optical fiber FB2. Then, in the multiplexing optical system 30, the p-polarized component of the interferogram L11 and the s-polarized component of the interferogram L12 are multiplexed by the multiplexing optical system 30, and the sample SP is irradiated with a resultant interferogram as the interferogram L2.

When the light L3 passing through the sample SP is incident on the demultiplexing optical system 40, the light L3 is demultiplexed depending on a polarized state of the light L3 by the polarization beam splitter 41 provided in the demultiplexing optical system 40. Specifically, the interferogram L41 of the p-polarized light contained in the light L3 is transmitted through the polarization beam splitter 41, and the interferogram L42 of the s-polarized light contained in the light L3 is reflected by the polarization beam splitter 41 so that the interferogram L41 and the interferogram L42 are demultiplexed. The demultiplexed interferogram L41 of the p-polarized light and the demultiplexed interferogram L12 of the s-polarized light are incident on the light receiver 50.

The interferogram L41 of the p-polarized light and the interferogram L12 of the s-polarized light incident on the light receiver 50 are received by the detector (not illustrated) provided in the light receiver 50. The light reception signal S1 obtained by receiving the interferogram L41 of the p-polarized light and the light reception signal S2 obtained by the interferogram L12 of the s-polarized light are output from the light receiver 50. The light reception signals S1 and S2 output from the light receiver 50 are input to the signal processing device 60 (see FIG. 7).

When the light reception signals S1 and S2 are input to the signal processing device 60, the noise remover 61 removes the noise superimposed on the light reception signals S1 and S2 by using the light reception signals S1 and S2. For example, the noise remover 61 performs processing of subtracting the light reception signal S2 from the light reception signal S1 to obtain the difference between the light reception signal S1 and the light reception signal S2, thereby removing the noise superimposed on the light reception signals S1 and S2.

Figure 8A:
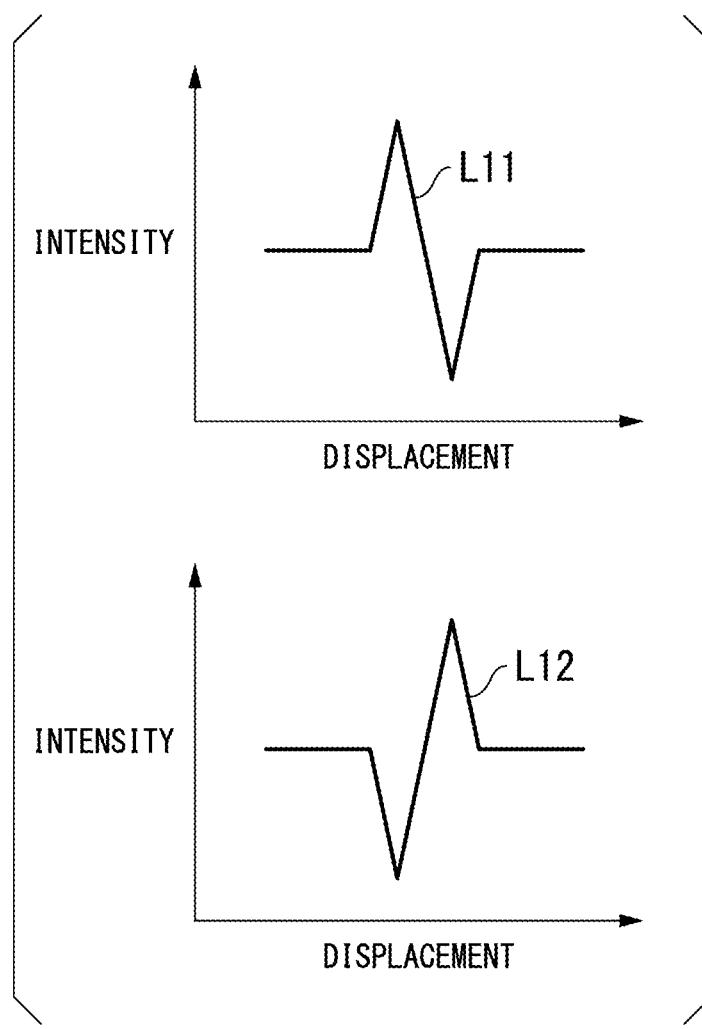
FIG. 8A is a first diagram illustrating a principle of removing noise superimposed on a light reception signal in the embodiment of the present invention.
Figure 8B:
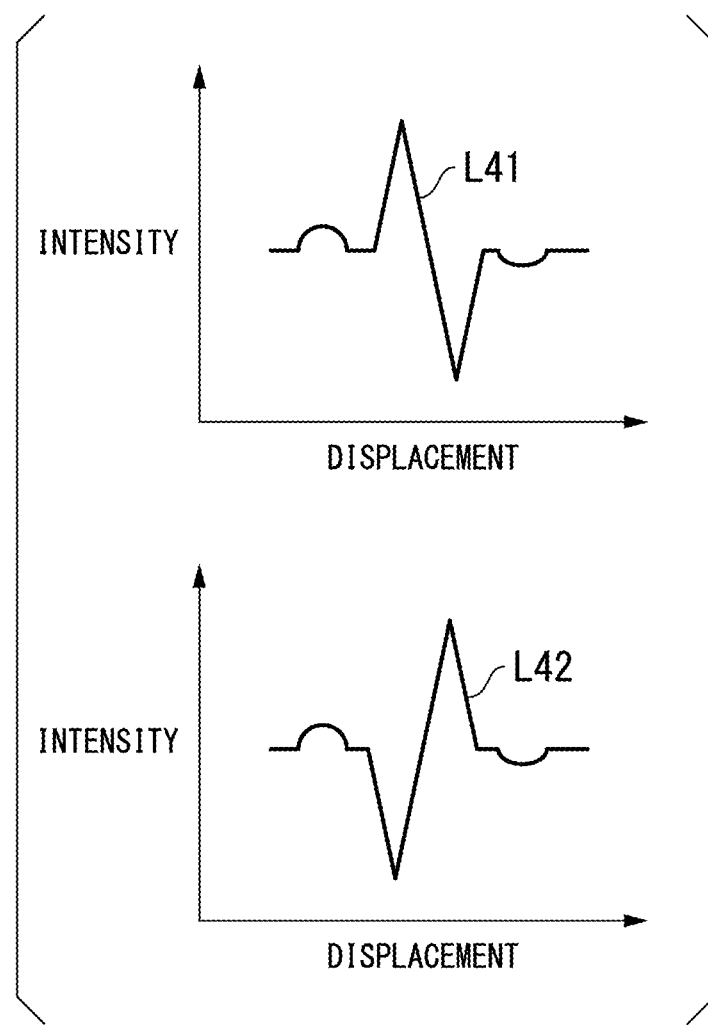
FIG. 8B is a second diagram illustrating the principle of removing the noise superimposed on the light reception signal in the embodiment of the present invention.

FIGS. 8A and 8B are diagrams illustrating a principle of removing noise superimposed on the light reception signal in an embodiment of the present invention. Here, since the light reception signals S1 and S2 are obtained by receiving the interferograms L41 and L42, the principle of removing the noise will be described using the interferograms.

FIG. 8A is a diagram schematically illustrating the interferograms L11 and L12 with which the sample SP is irradiated. FIG. 8B is a diagram schematically illustrating interferograms L41 and L42 contained in the light L3 passing through the sample SP. In FIGS. 8A and 8B, a displacement of the moving mirror 23 included in the interferometer 20 is set as a horizontal axis, and an intensity of the interferogram is set as a vertical axis.

The interferograms L11 and L12 have a relationship in which the intensity distributions are inverted from each other, as illustrated in FIG. 8A. That is, the interferograms L11 and L12 have a relationship in which, when the intensity distribution of the interferogram L11 is inverted, the intensity distribution of the interferogram L12 is obtained, and when the intensity distribution of the interferogram L12 is inverted, the intensity distribution of the interferogram L11 is obtained. Further, since the interferograms L11 and L12 are interferograms with which the sample SP is irradiated, the noise caused by the temporal change in the optical characteristics of the sample SP is not superimposed.

Since the interferograms L41 and L42 are obtained by demultiplexing the interferograms L11 and L12 passing through the sample SP, the interferograms L41 and L42 generally have a relationship in which the intensity distributions are inverted from each other, like the interferograms L11 and L12. Here, the interferograms L41 and L42 are similarly influenced by the temporal change in the optical characteristics of the sample SP when passing through the sample SP. Therefore, similar noise is superimposed on the interferograms L41 and L42, as illustrated in FIG. 8B.

Therefore, for example, when the processing of subtracting the light reception signal S2 (that is, the signal obtained by receiving the interferogram L42) from the light reception signal S1 (that is, the signal obtained by receiving the interferogram L41) is performed, it is possible to remove noise superimposed on the light reception signals S1 and S2.

When the above processing is performed, the inverted light reception signal S2 (that is, the interferogram L42) and the light reception signal S1 (that is, the interferogram L41) are added. Therefore, a signal strength of a light reception signal obtained by performing the subtraction on the light reception signals S1 and S2 is twice that of the light reception signals S1 and S2.

When the above processing ends, the light reception signal obtained by performing the subtraction on the light reception signals S1 and S2 is output from the noise remover 61 to the Fourier transformer 62. The Fourier transformer 62 performs processing of performing Fourier transform processing on the light reception signal output from the noise remover 61 to obtain the spectrum of the wavelength component in the analysis wavelength band. By such processing being performed, a spectrum from which the noise caused by the temporal change in the optical characteristics of the sample SP has been removed (that is, the spectrum of the wavelength component in the analysis wavelength band) is obtained.

As described above, in the present embodiment, the interferometer 20 that obtains the interferograms L11 and L12 whose intensity distributions are inverted from each other, the multiplexing optical system 30 that multiplexes the interferograms L11 and L12 and irradiates the sample SP with a resultant interferogram as the interferogram L2, and the demultiplexing optical system 40 that demultiplex the interferograms L41 and L42 contained in the light L3 passing through the sample SP are included. The noise-removed spectrum of the wavelength component in the analysis wavelength band that is a wavelength band in which a spectrum is obtained is obtained by using the light reception signal S1 obtained by receiving the demultiplexed interferogram L41 and the light reception signal S2 obtained by receiving the demultiplexed interferogram L42. This makes it possible to realize high analysis accuracy by effectively utilizing the light to be used for analysis without waste.

Here, it is assumed that there is no light loss in the multiplexing optical system 30 and the demultiplexing optical system 40. When the configurations of the multiplexing optical system 30 and the demultiplexing optical system 40 are the first configuration example and the fourth configuration example illustrated in FIGS. 3 and 6, it is possible to effectively utilize most of the interferograms L11 and L12 without waste. When the configurations of the multiplexing optical system 30 and the demultiplexing optical system 40 are the second configuration example and the third configuration example illustrated in FIGS. 4 and 5, about half of the interferograms L11 and L12 is wasted. However, it is possible to effectively utilize the interferograms L11 and L12 to the same extent as or higher than a Fourier spectrophotometer of the related art.

As described above, in the present embodiment, it is possible to effectively utilize the light to be used for analysis of the sample SP without waste as much as possible to the same extent as or higher than the Fourier spectrophotometer of the related art, and to increase an S/N ratio of the light reception signals S1 and S2. This makes it possible to realize high analysis accuracy. The same applies to a case in which the sample SP whose optical characteristics fluctuate with time is analyzed.

Although the Fourier spectrophotometer according to the embodiment of the present invention has been described above, the present invention is not limited to the above embodiment and can be freely changed within the scope of the present invention. For example, the example in which the signal processing device 60 immediately performs processing by using the light reception signals S1 and S2 output from the light receiver 50 has been described in the above-described embodiment. However, the light reception signals S1 and S2 output from the light receiver 50 may be stored in a memory and the processing in the signal processing device 60 may be performed later.

REFERENCE SIGNS LIST

1 Fourier spectrophotometer
10 Light source
20 Interferometer
21 Half mirror
22 Fixed mirror
23 Moving mirror
30 Multiplexing optical system
31 Polarization beam splitter
32, 33 Polarizer
40 Demultiplexing optical system
41 Polarization beam splitter
50 Light receiver
60 Signal processing device
61 Noise remover
62 Fourier transformer
A1 Irradiation area
FP1, FP2 Position
L0 Light
L01, L02 Branch light
L2 Interferogram
L11, L12 Interferogram
L41, L42 Interferogram
LS1, LS2 Lens
M1, M2 Reflection mirror
PT1, PT2 Output port
S1, S2 Light reception signal
SP Sample

The invention claimed is:

1. A Fourier spectrophotometer comprising:
a light source configured to emit light containing a wavelength component in an analysis wavelength band, the analysis wavelength band being a wavelength band in which a spectrum of light passing through a sample as an analysis target is obtained;
an interferometer configured to obtain a first interferogram and a second interferogram whose intensity distributions are inverted from each other as interferograms from the light emitted from the light source, the interferograms being interference light;
a multiplexer configured to multiplex the first interferogram with the second interferogram to irradiate the sample with a resultant interferogram;
a demultiplexer configured to demultiplex the first interferogram and the second interferogram contained in the light passing through the sample;
a light receiver configured to output a first light reception signal obtained by receiving the demultiplexed first interferogram and a second light reception signal obtained by receiving the demultiplexed second interferogram; and
a signal processer configured to perform processing for obtaining a noise-removed spectrum of the wavelength component in the analysis wavelength band by using the first light reception signal and the second light reception signal,
wherein the multiplexer comprises a polarization multiplexing element configured to multiplex the first interferogram in a first polarized state among the first interferograms obtained by the interferometer, with the second interferogram in a second polarized state different from the first polarized state among the second interferograms obtained by the interferometer, and
the demultiplexer comprises a polarization demultiplexing element configured to demultiplex the first interferogram and the second interferogram contained in the light passing through the sample according to polarized states of the first interferogram and the second interferogram.

2. The Fourier spectrophotometer according to claim 1, wherein the signal processor comprises:
a noise remover configured to remove noise by obtaining a difference between the first light reception signal and the second light reception signal; and a Fourier transformer configured to perform Fourier transform processing on a signal indicating the difference obtained by the noise remover to obtain the spectrum of the wavelength component in the analysis wavelength band.

3. The Fourier spectrophotometer according to claim 1, wherein the multiplexer comprises:
a first polarizer configured to cause the first interferogram obtained by the interferometer to enter the first polarized state; and
a second polarizer configured to cause the second interferogram obtained by the interferometer to enter the second polarized state.

4. The Fourier spectrophotometer according to claim 1, wherein the multiplexer comprises a first deflection element configured to direct the first interferogram in the second polarized state and the second interferogram in the first polarized state passing through the polarization multiplexing element to the sample, and
the demultiplexer comprises a second deflection element configured to direct light reflected by the first deflection element and passing through the sample to the polarization demultiplexing element.

5. The Fourier spectrophotometer according to claim 1, wherein the interferometer comprises:
a half mirror configured to branch the light emitted from the light source into a first branch light and a second branch light, and cause the first branch light and the second branch light passing through different optical paths to interfere with each other to obtain the first interferogram and the second interferogram;
a fixed mirror configured to reflect the first branch light branched by the half mirror and cause the first branch light to be incident on the half mirror;
a moving mirror configured to be able to reciprocate along an optical path of the second branch light, reflect the second branch light branched by the half mirror, and cause the second branch light to be incident on the half mirror;
a first output configured to output the first interferogram to the outside; and
a second output configured to output the second interferogram to the outside.

6. The Fourier spectrophotometer according to claim 1, wherein the light source is a halogen lamp having a wavelength bandwidth of 350 [nm] to 4500 [nm].

7. The Fourier spectrophotometer according to claim 1, wherein the light receiver comprises a detector capable of receiving a wavelength component of 1 [μm] to 2.5 [μm].

8. The Fourier spectrophotometer according to claim 1, wherein the first polarized state is p-polarized light, and the second polarized state is s-polarized light.

9. The Fourier spectrophotometer according to claim 3, wherein the polarization multiplexing element
transmits the first interferogram converted into the first polarized state by the first polarizer, and
reflects the second interferogram converted into the second polarized state by the second polarizer.

10. The Fourier spectrophotometer according to claim 1, wherein the polarization demultiplexing element transmits the light in the first polarized state contained in the light passing through the sample and reflects the light in the second polarized state contained in the light passing through the sample.

11. The Fourier spectrophotometer according to claim 1, wherein the polarization multiplexing element transmits a first polarized state component of the first interferogram and reflects a second polarized state component of the first interferogram, and transmits the first polarized state component of the second interferogram and reflects the second polarized state component of the second interferogram.

12. The Fourier spectrophotometer according to claim 11, wherein the polarization multiplexing element irradiates the sample with the transmitted first polarized state component of the first interferogram and the reflected second polarized state component of the second interferogram.

13. The Fourier spectrophotometer according to claim 4, wherein the first deflection element and the second deflection element are reflection mirrors.

14. The Fourier spectrophotometer according to claim 4, wherein the polarization multiplexing element emits the reflected second polarized state component of the first interferogram and the transmitted first polarized state component of the second interferogram to the first deflection element.

15. The Fourier spectrophotometer according to claim 2, wherein the signal processor removes noise superimposed on the first light reception signal and the second light reception signal by performing processing of subtracting the second light reception signal from the first light reception signal.

* * * * *